(12) United States Patent
Krefman

(10) Patent No.: US 7,568,798 B2
(45) Date of Patent: Aug. 4, 2009

(54) DISPLAY FOR EYEGLASSES WITH MULTIPLE OPTICAL CENTER DISTANCES AND METHOD FOR DISPLAYING SUCH EYEGLASSES

(75) Inventor: Ronald Krefman, Highland Park, IL (US)

(73) Assignee: OTC Optics, LLC

( * ) Notice: Subject to any disclaimer, the term of this patent is extended or adjusted under 35 U.S.C. 154(b) by 210 days.

(21) Appl. No.: 11/408,205

(22) Filed: Apr. 21, 2006

(65) Prior Publication Data

US 2007/0132946 A1   Jun. 14, 2007

(51) Int. Cl.
    G02C 7/02    (2006.01)
(52) U.S. Cl. .................. 351/177; 351/159; 351/204
(58) Field of Classification Search ............... 351/159, 351/204
    See application file for complete search history.

(56) References Cited

U.S. PATENT DOCUMENTS

| 1,090,232 | A | 3/1914 | Riggs |
| 4,561,739 | A | 12/1985 | Okazaki |
| 4,762,406 | A | 8/1988 | Steiner |
| 4,898,459 | A | 2/1990 | Eriksson |
| 5,100,006 | A | 3/1992 | Forrester |
| 5,499,063 | A | 3/1996 | Butler et al. |
| 5,694,194 | A | 12/1997 | Morrison |
| 5,808,720 | A | 9/1998 | Morrison |
| 5,867,246 | A * | 2/1999 | Edwards et al. ............ 351/169 |
| 6,062,691 | A * | 5/2000 | Markson .................... 351/203 |
| 6,183,081 | B1 | 2/2001 | Ono et al. |
| 6,910,769 | B2 | 6/2005 | Renard |
| 2003/0189687 | A1* | 10/2003 | Renard ...................... 351/159 |
| 2006/0238705 | A1* | 10/2006 | Renard ...................... 351/204 |

* cited by examiner

Primary Examiner—Jordan M. Schwartz
(74) Attorney, Agent, or Firm—Katten Muchin Rosenman LLP

(57) ABSTRACT

The invention is directed to over the counter (OTC) eyeglasses with improved optical center distance (OCD) settings. The improved settings include a single best OCD setting for the eyeglasses. Alternatively, plural pairs of eyeglasses, having different OCD settings are provided for purchase. A display and method for the display of such eyeglasses is also claimed and described.

25 Claims, 4 Drawing Sheets

US 7,568,798 B2

DISPLAY FOR EYEGLASSES WITH MULTIPLE OPTICAL CENTER DISTANCES AND METHOD FOR DISPLAYING SUCH EYEGLASSES

FIELD OF INVENTION

The present invention relates to over-the-counter (OTC), ready-made eyeglasses and a display therefor. More particularly, the invention relates to a plurality of eyeglasses wherein a first pair of eyeglasses has a different optical center distance (OCD) relative to a second pair of eyeglasses. The invention also relates to a pair of eyeglasses with a single OCD that is 60.4 mm.

BACKGROUND OF THE INVENTION

Ready-made reading glasses are made and sold in assorted magnifications to allow wearers to choose the proper magnification for their requirements. The magnification is a measure of the diopter or focusing power of the lenses contained within each pair of eyeglasses. All diopter lenses have undesirable aberrations and prismatic effects which are encountered if viewed through any point away from the lens optical center. Viewing through significant aberrations and prism may cause eye fatigue, eyestrain, blurred vision, headaches, loss of concentration and difficulty reading or doing prolonged "near work" with eyeglasses. For that reason, guidelines set forth by the International Organization for Standardization (ISO) call for horizontal tolerances of 0.66 prism diopters (cm/m) per pair, or less to ensure comfortable vision. ISO 16034: "Ophthalmic optics—Specifications for single-vision ready-to-wear near-vision spectacles". Aberrations and prism increase as a result of two constraints: 1) the diopter power (higher power lenses contain more aberrations and prism), and 2) the position of the line of vision relative to the optical center of the lens (looking through the inner or outer edge of the lens induces more aberrations and prism than looking through the optical center). If the wearer is looking through the optical centers of the lenses, then the aberrations and prism are minimized.

Custom made prescription eyewear is made to ensure that unwanted aberrations and prism are minimized at the lens optical center. This is accomplished by the optical provider first measuring the user's separation between left and right eye, or pupillary distance (PD). FIG. 1. illustrates the pupils 1a and 1b and the PD 2a. Once the PD is known, then the prescription eyeglasses are custom made to match the separation between the optical centers to the user's PD.

Each lens, 3a and 3b as illustrated in FIG. 2, is mounted into an eyeglass frame held by lens mountings 6a and 6b. The lens 3a and 3b placement within the lens mounting 6a and 6b determines where the lens optical centers 4a and 4b are positioned. Ideally, the optical centers 4a and 4b will coincide with each of the user's pupils. In prescription eyeglasses, the optical provider is careful to mount the lenses 3a and 3b so that the optical centers 4a and 4b are positioned directly in front of the user's pupils. Hence, the OCD 5a matches the PD, resulting in minimal aberrations and prism as the wearer gazes straight ahead, as shown in FIG. 3.

As seen in FIG. 4, the pupils 4a and 4b may be spaced such that the PD 2b may be wider than the pre-set OCD 5a between optical centers 4a and 4b. Or, as seen in FIG. 5, the pupils 4a and 4b may be spaced such that the PD 2c may be narrower than the pre-set OCD 5a between optical centers 4a and 4b. Discrepancies between PD and OCD create unwanted prism and aberrations.

In contrast to custom made prescription eyewear, OTC, ready-made eyeglasses, have a pre-set OCD such that only one OCD is offered by sellers. As the PD is known to vary greatly in the general population, and ranges from 45 millimeters (mm) to 80 mm, a single OCD cannot cover the range of normally occurring PDs. Thus, OTC, ready-made eyeglasses comprise excessive aberrations and prism for some wearers of eyeglasses. Aberrations and prism are more pronounced if the user requires higher powered eyeglasses or has a PD significantly wider or narrower than the offered pre-set OCD. Thus, some wearers are exposed to more aberrations and prism and may experience eyestrain or other symptoms. Hence, no single OCD setting is capable of minimizing aberrations and prism for all PDs.

U.S. Pat. Nos. 6,910,769 and 4,898,459 both disclose reading spectacles comprising a film overlay. The overlay enables a person to identify a pair of spectacles having the correct optical center (i.e., OCD) to match the wearer's pupillary separation (i.e., the PD). The '769 patent discloses a combination of a pair of spectacles having two near focal powers and a type of display mechanism that allows the purchaser to choose not only the correct power needed, but also the correct pair of glasses to match the user's PD. Optical centers of finished reading glasses are marked at the place of manufacture, then a display device including an opaque polyvinyl static cling film having two holes therein is placed onto the lenses, at the place of manufacture, such that the holes in the film overlie the optical centers. When the user dons the glasses, if a solid round area is viewed, the spectacles have the correct size for the user's PD. If a figure eight or two holes is viewed, the PD is too wide. If the user views the outside edges, the PD is too narrow. By visual observation, the user can find the correctly sized reading glasses. Similarly, The spectacles disclosed in the '459 patent comprise an opaque film that allows the user to test suitability of the spectacles for their PD.

The eyeglasses comprising the film described in the '769 and '459 patents are made using a process that is expensive and interferes with vision while the user tries on the eyeglasses and attempts to look through the film. Therefore, there is a need for OTC ready made eyeglasses that do not comprise such a film and that can accommodate a variety of PDs, for single vision, bifocal and multifocal reading glasses, thus minimizing the aberrations and prism thereby increasing the comfort and wearability of the eyeglasses.

SUMMARY OF THE INVENTION

In one aspect, the invention is directed to a novel combination of structure and/or function whereby eyeglasses are provided, each comprising: two static lenses; wherein: a first pair of eyeglasses has a first lens and a second lens wherein said first lens and second lens each have a first optical center and a second optical center, respectively, that are spaced at a first OCD; and a second pair of eye glasses has a third lens and a fourth lens wherein said third lens and fourth lens each have a third optical center and a fourth optical center, respectively, that are spaced at a second OCD, wherein said first OCD is different from said second OCD each of the plurality of pairs of eyeglasses being uncovered by any layer that is releasably attached to the two static lenses of any of the plurality of pairs of eyeglasses.

In another aspect, the invention is directed to a novel combination of structure and/or function whereby an eyeglass display is provided for the display of a plurality of pairs of eyeglasses comprising: a plurality of holders configured to removably retain the plurality of pairs of eyeglasses; a plurality of pairs of eyeglasses, each comprising: two static lenses; wherein: a first pair of eyeglasses has a first lens and a second lens wherein said first lens and second lens each have a first optical center and a second optical center, respectively, that are spaced at a first OCD; and a second pair of eye glasses has a third lens and a fourth lens wherein said third lens and fourth lens each have a third optical center and a fourth optical center, respectively, that are spaced at a second OCD, wherein said first OCD is different from said second OCD each of the plurality of pairs of eyeglasses being uncovered by any layer that is releasably attached to the two static lenses of any of the plurality of pairs of eyeglasses.

In yet another aspect, the invention provides a method for displaying a plurality of pairs of eyeglasses on a display comprising: arranging a plurality of pairs of eyeglasses on a display, wherein the display comprises a plurality of placeholders that removably retain the plurality of pairs of eyeglasses; and wherein each of the plurality of pairs of eyeglasses comprises: two static lenses; wherein: a first pair of eyeglasses has a first lens and a second lens wherein said first lens and second lens each have a first optical center and a second optical center, respectively, that are spaced at a first OCD; and a second pair of eye glasses has a third lens and a fourth lens wherein said third lens and fourth lens each have a third optical center and a fourth optical center, respectively, that are spaced at a second OCD, wherein said first OCD is different from said second OCD each of the plurality of pairs of eyeglasses being uncovered by any layer that is releasably attached to the two static lenses of any of the plurality of pairs of eyeglasses.

In still another aspect, the invention provides a plurality of pairs of eyeglasses, comprising: at most four optical center distances (OCDs) wherein: the OCDs are configured to accommodate at least 95% of the adult human population at any Diopter power of the plurality of pairs of eyeglasses.

In another aspect, the invention provides a plurality of pairs of eyeglasses, comprising: at most three optical center distances (OCDs) wherein: the OCDs are configured to accommodate at least 95% of the adult human population at any Diopter power of the plurality of pairs of eyeglasses.

In yet another aspect, the invention provides a plurality of pairs of eyeglasses, comprising: at most two optical center distances (OCDs) wherein: the OCDs are configured to accommodate at least 95% of the adult human population at any Diopter power of the plurality of pairs of eyeglasses.

In another aspect, the invention provides a plurality of pairs of eyeglasses, comprising: at least two optical center distances (OCDs) wherein: the OCDs are selected to reduce the prism for a greater segment of the NPDs occurring in the adult human population at a given range of Diopter powers of the plurality of pairs of eyeglasses, than could occur with a single OCD setting.

As used herein, the term "placeholder" or "placeholders" means any device that may be used to hold the eyeglasses on the eyeglass display. The holder 400 may, as shown in FIG. 6 for example, comprise a support 401 on which the nosepiece 402 of the eyeglasses rests and perforations 403 and 404 in the display through which the temples 405 of the eyeglasses 406 fit. Alternatively, the holder may be, for example, a segment of Velcro™ that is removably affixed to the eyeglasses and to the display and thus removably retains the eyeglasses on the display. In yet another alternative, the holder may be a magnetic holder that is imbedded in the eyeglasses (e.g., in the frame). The eyeglasses are then held on a display comprising metallic surfaces to which the eyeglasses are retained via magnetic forces.

The eyeglasses 406 held on the holder may bear a removably or permanently affixed indicia, such as a label 407 on the lens 408 of the eyeglasses in FIG. 6, indicating the OCD in measured units (e.g., millimeters or inches), or indicating an assumed name for OCD such as "Narrow" or "Medium" or "Wide" or it may indicate the PD, or range of PDs either in measured units (e.g., millimeters or inches), or an assumed name for PD or range of PDs such as "Narrow" or "Medium" or Wide" that will be satisfied by the eyeglasses. The indicia, however, may be located anywhere on the eyeglasses (e.g., at the temples 405) and may be permanent or removably affixed to the eyeglasses by any means known in the art. In addition, the indicia may be located anywhere on the display such that the user will know from looking at the indicia that the eyeglasses he/she is selecting fit their particular PD.

As used herein, the term "static lenses" two individual and separate lenses that are neither slideable nor removable; that is, the lenses are not slideable such that the lenses may be moved in any way with respect to the frames to change the location of the optical center of the eyeglasses relative to the PD of the person wearing the eyeglasses. See, e.g., U.S. Pat. No. 4,762,406. The term also refers to a pair of lenses embodied within a one piece molded lens unit.

As used herein, the term "temple" or "temples" refers to any device for securing the eyeglasses to the head of the user.

As used herein, the term "nosepiece" refers to any device for supporting the eyeglasses before the eyes of the user.

BRIEF DESCRIPTION OF THE DRAWINGS

Further features and objects of the present invention will become apparent to those skilled in the art to which the invention relates from a reading of the following specification with reference to the accompanying drawings, in which.

DETAILED DESCRIPTION OF THE INVENTION

I. Introduction

Figure 1:
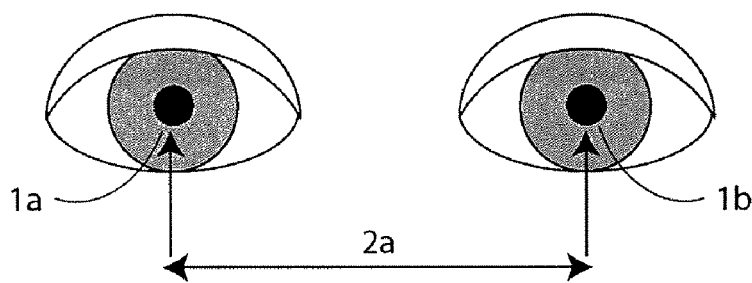
FIG. 1 presents a diagram showing two eyes comprising two pupils and the distance between the two pupils (i.e., the pupillary distance, PD)
Figure 2:
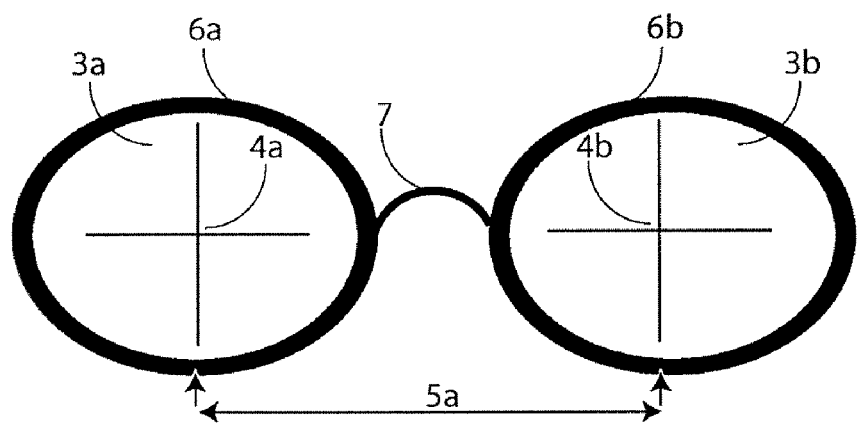
FIG. 2 presents a diagram showing eyeglasses with the optical centers denoted by the centers of the cross-hairs.

Known OTC, ready-made reading eyeglasses do not consider the variability in PD spacing between people's eyes. Presently available OTC, ready-made eyeglasses, have an OCD that is pre-set. Currently, only a single OCD is offered by each commercial seller of OTC eyeglasses. The OCD most commonly chosen is about 63 mm, which agrees with the average 63.4 PD in the adult human population. See, Neil A. Dodgson, *Stereoscopic Displays and Virtual Reality Systems*

*XI* (Andrew J. Woods, John O. Merritt, and Stephen A. Benton, eds., 2004). The PD is measured with the eyes positioned in straight-ahead-gaze for objects located far away from the eyes (e.g., at a distance of 6 m or more from the eyes), known as optical infinity where the visual axes between the right and left eyes are parallel. The PD for an object located far away from the eyes is known as the far pupillary distance (FPD). When reading, the visual axes converge, and the eyes turn inward narrowing the PD. There is a statistically significant difference between near and far PD. The near PD (NPD) is measured with the viewer converging at 40 cm, a typical reading distance, and the far PD with the viewer gazing at infinity. C. Evereklioğlu et al., *Turgut Özal Tip Merkezi Dergisi* 6: 84-91 (1999). Thus, the average NPD for the general population is actually about 3 mm less than the FPD. Consequently, to minimize prism, the OCD for OTC eyeglasses, according to the present invention, is set to be about 60.4 mm, rather than the standard 63.4 mm. In one embodiment, therefore, the invention provides a pair of eyeglasses with a single OCD that is about 3 mm less than the user's FPD. In a preferred embodiment, the invention provides a pair of eyeglasses with a single OCD of about 60.4 mm so as to accommodate a user with an FPD of about 63.4 mm.

In another embodiment, the invention provides OTC, ready-made reading eyeglasses in a variety of OCDs to accommodate a variety of PDs, thus minimizing the aberrations and prism effect and enhancing and prolonging the user's vision and comfort in using the eyeglasses. Furthermore, the eyeglasses are uncovered by any layer such as the film disclosed in U.S. Pat. Nos. 6,910,769 and 4,898,459 that is releasably attached to the lenses of the eyeglasses described therein.

It is envisioned that OTC, ready-made reading eyeglasses in a variety of OCDs to accommodate a variety of PDs will be sold in retail stores such as chain drug stores, convenience stores, food stores and mass market retailers. The user is expected to visit such a store where the OTC, ready-made reading eyeglasses in a variety of OCDs to accommodate a variety of PDs will be contained in an eyeglass display that may be located, for example, as a free-standing kiosk, an in-line fixture, an end-cap fixture, a side wing fixture, a hanging display, a counter top fixture, or the like, within the store. The free-standing kiosk, in-line fixture, end-cap fixture, side wing fixture, hanging display, counter top fixture, or the like, may be static, it may rotate as a whole, or may comprise portions that will rotate individually and other portions that are static. The user who already knows their PD will be able to choose from the display the pair of eyeglasses that most closely matches their PD. The user who does not know their PD, will be able to measure their PD or determine their proper OCD using the methods and devices discussed below.

It is also envisioned that the OTC, ready-made reading eyeglasses in a variety of OCDs to accommodate a variety of PDs, in addition to being sold in retail stores, may concurrently be sold through direct mail, mail order catalogs, over the internet and/or over the television such as through infomercials or television shopping channels II. The Display Each reading glass offered for sale will be marked for OCD setting or suitable PD range. In the store setting, the glasses can be displayed randomly by any means, and the consumer will use the removably or permanently affixed indicia discussed above to sort for themselves and select the appropriate OCD setting that is the best match for their PD. A more organized systematic method for display is described below.

Figure 7:
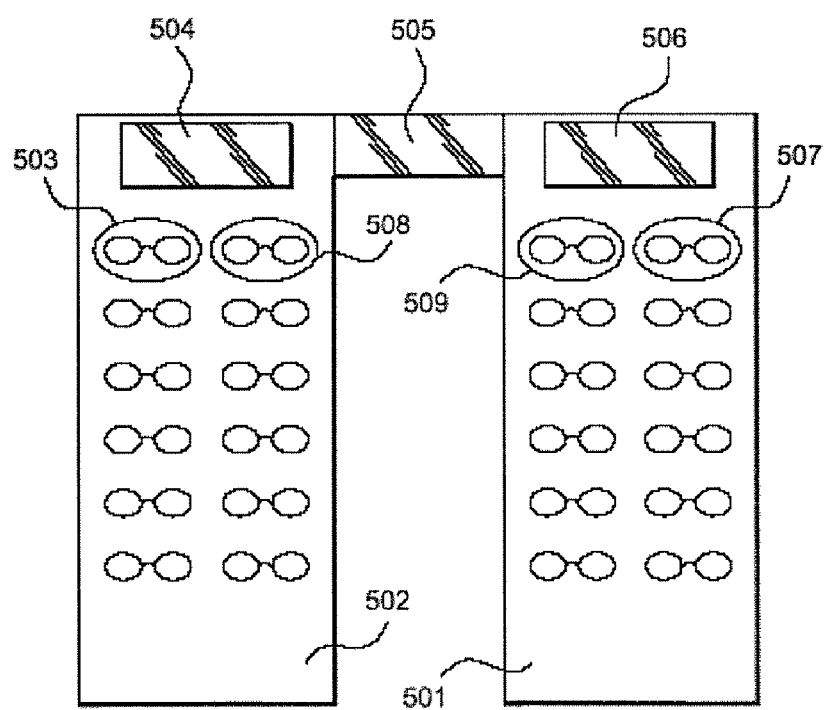
FIG. 7 presents a diagram of an eyeglass display for the display of a plurality of pairs of eyeglasses.

FIG. 7 presents a non-limiting diagram of an eyeglass display for the display of a plurality of pairs of eyeglasses. The display shown in FIG. 7 comprises two panels 501 and 502, comprising two columns of eyeglasses each, and a plurality of holders (not shown) configured to removably retain the plurality of pairs of eyeglasses that have two different OCDs. The eyeglasses 503 and 508, that are retained in the two columns of eyeglasses on panel 501, have a first lens and a second lens wherein the first lens and second lens each have a first optical center and a second optical center, respectively, that are spaced at a first OCD. The eyeglasses 507 and 509, that are retained in the two columns on panel 502, have a third lens and a fourth lens wherein the third lens and fourth lens each have a third optical center and a fourth optical center, respectively, that are spaced at a second OCD, wherein the first OCD is different from the second OCD. Thus, the eyeglasses 503/508 and 507/509 will accommodate users with a wider range of PDs than single OCD selling methods offer by virtue of the fact that they have two different OCDs.

While the eyeglass display shown in FIG. 7 may be used to display eyeglasses with only two OCDs, one might envision using the same display to display eyeglasses with two or more OCDs. Thus, for example, one might envision the display shown in FIG. 7 comprising eyeglasses in the columns comprising eyeglasses 508 and 509 that have OCDs that are different from each other and different from the OCDs of eyeglasses in the columns comprising eyeglasses 503 and 507.

Figure 8:
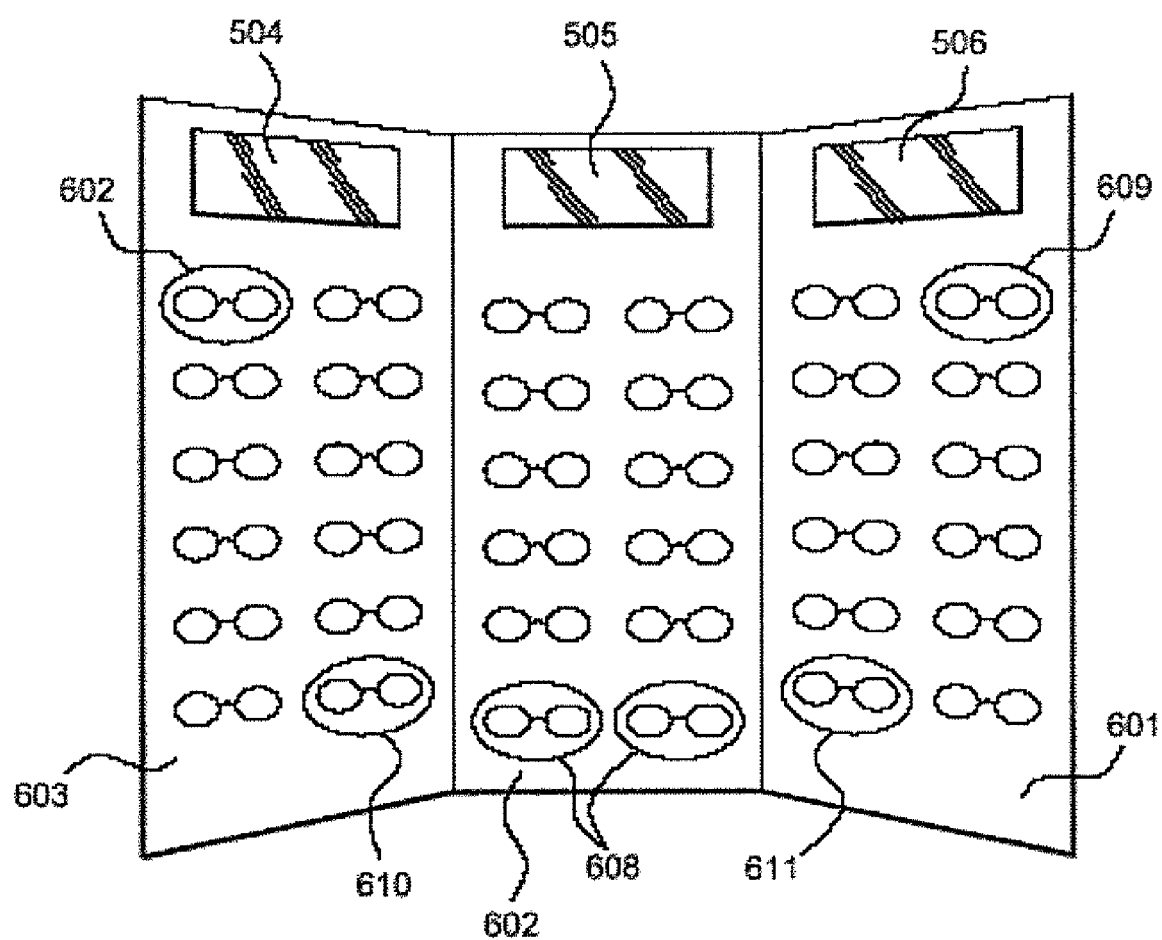
FIG. 8 presents a diagram of another eyeglass display for the display of a plurality of pairs of eyeglasses.

FIG. 8 presents another non-limiting diagram of an eyeglass display for the display of a plurality of pairs of eyeglasses. The eyeglass display shown in FIG. 8 comprises three panels 601, 602 and 603 and a plurality of holders (not shown) configured to removably retain the plurality of pairs of eyeglasses that have three different OCDs. The eyeglasses 607 and 610 that are retained in the two columns on panel 603 have a first lens and a second lens wherein the first lens and second lens each have a first optical center and a second optical center, respectively, that are spaced at a first OCD. The eyeglasses 608 that are retained in the two columns on panel 602 have a third lens and a fourth lens wherein the third lens and fourth lens each have a third optical center and a fourth optical center, respectively, that are spaced at a second OCD. The eyeglasses 609 and 611 that are retained in the two columns on panel 601 have a fifth lens and a sixth lens wherein the fifth lens and sixth lens each have a fifth optical center and a sixth optical center, respectively, that is spaced at a third OCD, wherein the third OCD is different from the first and second OCDs. Thus, the eyeglasses 607, 608, 609, 610 and 611 will accommodate users with a wider range of PDs by virtue of the fact that they have three different OCDs.

While the eyeglass display shown in FIG. 8 may be used to display eyeglasses with only three OCDs, one might envision using the same display to display eyeglasses with three or more OCDs. Thus, for example, one might envision the display shown in FIG. 8 comprising eyeglasses in the columns comprising eyeglasses 610 and 611 that have OCDs that are different from each other and different from the OCDs of eyeglasses in the columns comprising eyeglasses 607, 608 and 609.

The eyeglass display according to one embodiment of the present invention may comprise additional panels on the display comprising a plurality of holders configured to removably retain the plurality of pairs of eyeglasses that have multiple OCDs. The eyeglass display could also comprise a plurality of individual free-standing displays wherein each individual free-standing display comprises a plurality of holders configured to removably retain a plurality of pairs of eyeglasses and wherein the OCD of the eyeglasses retained in a first individual free-standing display is different from the OCD of the eyeglasses in a second individual free-standing display.

In the case where the eyeglass display comprises eyeglasses with four different OCDs, the fourth pair of eyeglasses has a seventh lens and an eighth lens wherein the seventh lens and eight lens each have a seventh optical center and an eighth optical center, respectively, that is spaced at a fourth OCD. The fourth OCD would be different relative to the first, second and third OCDs in the first, second and third pairs of eyeglasses on the display.

The eyeglass displays shown in FIG. 7 and FIG. 8 comprise sub-panels 504 and 506 that may be used for a variety of purposes, including, but not limited to displaying a logo and/or for providing instructions for using the device 505 to determine the user's Near PD or proper OCD, in case they do not know their PD, and for subsequently choosing the proper pair of eyeglasses. The device 505 may be affixed to the display, but need not be. The device for determining the OCD/Near PD for a user may be, for example, a device such as the one described in U.S. Pat. No. 4,944,585, or any of the other patented or commercially available devices specifically designed to measure Near PD A variety of other simple devices, however, can be used to determine the proper OCD for a given Near PD. For example, the device 505 may be a mirror comprising a millimeter or inch ruler adhered (e.g., in the form of a decal), painted, or etched thereon. Alternatively, the device may be a millimeter or inch ruler that is removably affixed to the display. An untrained companion that accompanies the user may assist the user by using the ruler to determine the user's Near PD or the user may be able to determine their Near PD without such assistance by using, for example a mirror—one that may be provided, e.g., in one of the sub-panels 504 or 506.

To determine their OCD for a given Near PD, fore example, the user may stand at a spot marked on the floor, where the spot is at a fixed distance (e.g., 16 inches) from a convex magnifying mirror. The mirror may comprise an inch/millimeter ruler, adhered, painted or etched thereon, that is scaled to accommodate for the distance between the user and the mirror and that further accounts for the distance in reflection and magnification of the mirror. While standing in the spot and looking into the mirror, the user would note where each pupil falls on the scale of the ruler, thus measuring their own Near PD.

Yet another device for determining the user's Near PD may comprise an opaque material (made of, e.g., paper, cardboard and plastic) with openings in the material that are separated by known distances corresponding to the Near PD. The user would then read, for example, type that may be affixed to sub-panel 504 or 506 while looking through the openings. The separation between holes that matches the user's Near PD would provide a single image of the type, whereas wider or narrower hole separation would result in two images or a blurring of the type. Similarly, the user could look at a source of illumination rather than reading the type. The light emanating from the source of illumination would appear as two sources through the openings in the transparent material that are wider or narrower than the Near PD.

Alternatively, type, an object of regard, or a source of illumination may be viewed using a device comprising thin opaque items (made of, e.g., paper, cardboard and plastic), without openings thereon, that are positioned before each pupil in either a series of fixed distances, or in a configuration that allows movement left to right while the user views the type, or object of regard, or source of illumination. When the separation between the opaque items, without openings thereon, covers the pupils, the type or source of illumination will be obscured, and the separation between the opaque items will correspond to the OCD.

Alternatively, the device may be markings on the lenses of each of the eyeglasses, where the markings comprise removable ink, or the like, or other markings to identify the optical centers or the area surrounding the optical centers. The user would don the eyeglasses thus marked, and look in a mirror or view reading material to test or confirm that the optical center markings align with the pupils. The markings on the lenses of each of the eyeglasses themselves could take a variety of configurations, including but not limited to, a circle, an "X", a cross, etc. Similarly, the area of the optical center could remain clear, and removable ink or other markings surround it to obscure vision so that the user would only see through the area of the optical center thus confirming a match for the OCD. These markings could be removed with water or with an alcohol solution (e.g., ethanol and isopropanol) or other chemical agents (e.g., acetone).

In the event that the known NPD for a user (e.g., one previously determined for the user by an optical provider) or the NPD determined using the device does not exactly match the OCD of a pair of eyeglasses on the display, the user would preferably select a pair of eyeglasses from the display that is within the accepted tolerances to keep prism below 0.66 prism diopters (cm/m) per pair. For example, with a +2.75 Diopter lens, to maintain these tolerances the NPD must not differ from the OCD by more than 2.40 mm as shown in Table 1, below.

TABLE 1

| Diopter | Range of variation between OCD and PD to keep Prism < 0.66 |
|---|---|
| +1.00 | 6.60 |
| +1.25 | 5.28 |
| +1.50 | 4.40 |
| +1.75 | 3.77 |
| +2.00 | 3.30 |
| +2.25 | 2.93 |
| +2.50 | 2.64 |
| +2.75 | 2.40 |
| +3.00 | 2.20 |

Alternatively, if the tolerance for maximum prism is adjusted up or down from 0.66 prism diopters, the range of variation between OCD and PD to meet the selected prims tolerance will necessarily collapse or expand for each Diopter.

III. The Eyeglasses

A. Eyeglasses With A Single OCD

As mentioned above, presently available OTC, ready-made eyeglasses, have an OCD that is pre-set at about 63 mm. But, the average NPD for the general population is actually about 3 mm less than the FPD. Consequently, to minimize prism, the OCD for OTC eyeglasses, according to the present invention, is set to be about 60.4 mm.

Table 3, below, shows prism values determined according to formula (I), where The OCD is 63.4 mm and corresponds to the most common commercially available OCD.

$$\text{Prism} = (\text{OCD} - \text{NPD}) \times 0.1 \times \text{diopter} \qquad (I)$$

The stepped line in Table 3 denotes the percentage of the population of users that falls under each NPD measurement, with a majority of users having an NPD of about 60 mm. An OCD of 63.4 mm creates unwanted prism in excess of the recommended 0.66 prism diopters errors (shaded areas) for a significant proportion of normal NPD/Diopter combinations. The excessive prism shown in the shaded areas does not coincide with the majority of NPD values beneath the stepped line. Hence, the OCD of 63.4 mm creates an unacceptable level of prism for a large segment of the population of users.

lenses. The lens shape may be concave and convex and may have a variety of colors or coatings (e.g., an antireflective, or photochromic coating).

The frame of the eyeglasses according to certain aspects of the present invention may be made of any material, including, but not limited to metal, plastic, nylon, polycarbonate or combinations of the aforementioned materials.

TABLE 2

PRISM VALUES ACROSS RANGE OF NPDs AND DIOPTERS FOR SINGLE OCD 60.4

| OCD 60.4 | 50 | 51 | 52 | 53 | 54 | 55 | 56 | 57 | 58 | 59 | 60 | 61 | 62 | 63 | 64 | 65 | 66 | 67 | 68 | 69 | 70 | | |
|---|---|---|---|---|---|---|---|---|---|---|---|---|---|---|---|---|---|---|---|---|---|---|---|
| +3.00 | | | | | | | | | | 0.42 | 0.12 | 0.18 | 0.48 | | | | | | | | | 11.00% | % of |
| +2.75 | | | | | | | | | 0.66 | 0.39 | 0.11 | 0.17 | 0.44 | | | | | | | | | 9.75% | Population |
| +2.50 | | | | | | | | | 0.60 | 0.35 | 0.10 | 0.15 | 0.40 | 0.65 | | | | | | | | 8.50% | each PD |
| +2.25 | | | | | | | | 0.54 | 0.32 | 0.09 | 0.14 | 0.36 | 0.59 | | | | | | | | | 7.25% | shown as |
| +2.00 | | | | | | | | 0.48 | 0.28 | 0.08 | 0.12 | 0.32 | 0.52 | | | | | | | | | 6.00% | stepped line |
| +1.75 | | | | | | | 0.60 | 0.42 | 0.25 | 0.07 | 0.11 | 0.28 | 0.46 | 0.63 | | | | | | | | 4.75% | |
| +1.50 | | | | | | 0.66 | 0.51 | 0.36 | 0.21 | 0.06 | 0.09 | 0.24 | 0.39 | 0.54 | | | | | | | | 3.50% | |
| +1.25 | | | | | 0.55 | 0.43 | 0.30 | 0.18 | 0.05 | 0.08 | 0.20 | 0.33 | 0.45 | 0.58 | | | | | | | | 2.25% | |
| +1.00 | | | | 0.64 | 0.54 | 0.44 | 0.34 | 0.24 | 0.14 | 0.04 | 0.06 | 0.16 | 0.26 | 0.36 | 0.46 | 0.56 | 0.66 | | | | | 1.00% | |

An OCD of 60.4 mm, in contrast to an OCD of 63.4 mm, minimizes the prism and aberrations encountered by a majority of eyeglass users. As shown below, in Table 2, by selecting 60.4 mm as the OCD, nearly all NPDs in the normal population (area under stepped line) will encounter minimum prism and aberrations. In Table 2, the shaded areas denoting excessive prism, fall outside the normal NPD distribution for most NPD/Diopter combinations.

The eyeglasses according to certain aspects of the present invention may be of any lens diopter power, and embrace any configuration such as single vision lenses, bifocal, trifocal or progressive addition lenses. For example, the diopter power may range from about +1.00 to about +3.00; or from about +1.00 to about +2.75; or from about +1.00 to about +2.00; or from about +2.00 to about +3.00. In one embodiment, the diopter power is about +1.00; or about +1.25; or about +1.50;

TABLE 3

PRISM VALUES ACROSS RANGE OF NPDs AND DIOPTERS FOR SINGLE OCD 63.4

| OCD 63.4 | 50 | 51 | 52 | 53 | 54 | 55 | 56 | 57 | 58 | 59 | 60 | 61 | 62 | 63 | 64 | 65 | 66 | 67 | 68 | 69 | 70 | | |
|---|---|---|---|---|---|---|---|---|---|---|---|---|---|---|---|---|---|---|---|---|---|---|---|
| +3.00 | | | | | | | | | | | 0.60 | 0.30 | 0.00 | 0.30 | 0.60 | | | | | | | 11.00% | % of |
| +2.75 | | | | | | | | | | | 0.55 | 0.28 | 0.00 | 0.28 | 0.55 | | | | | | | 9.75% | Population |
| +2.50 | | | | | | | | | | | 0.50 | 0.25 | 0.00 | 0.25 | 0.50 | | | | | | | 8.50% | each PD |
| +2.25 | | | | | | | | | | | 0.45 | 0.23 | 0.00 | 0.23 | 0.45 | | | | | | | 7.25% | shown as |
| +2.00 | | | | | | | | | | 0.60 | 0.40 | 0.20 | 0.00 | 0.20 | 0.40 | 0.60 | | | | | | 6.00% | stepped line |
| +1.75 | | | | | | | | | | | 0.53 | 0.35 | 0.18 | 0.00 | 0.18 | 0.35 | 0.53 | | | | | 4.75% | |
| +1.50 | | | | | | | | | | 0.60 | 0.45 | 0.30 | 0.15 | 0.00 | 0.15 | 0.30 | 0.45 | 0.60 | | | | 3.50% | |
| +1.25 | | | | | | | | | 0.63 | 0.50 | 0.38 | 0.25 | 0.13 | 0.00 | 0.13 | 0.25 | 0.38 | 0.50 | 0.63 | | | 2.25% | |
| +1.00 | | | | | | | | | 0.60 | 0.50 | 0.40 | 0.30 | 0.20 | 0.10 | 0.00 | 0.10 | 0.20 | 0.30 | 0.40 | 0.50 | 0.60 | 1.00% | |

B. Eyeglasses With Multiple OCDs

Figure 3:
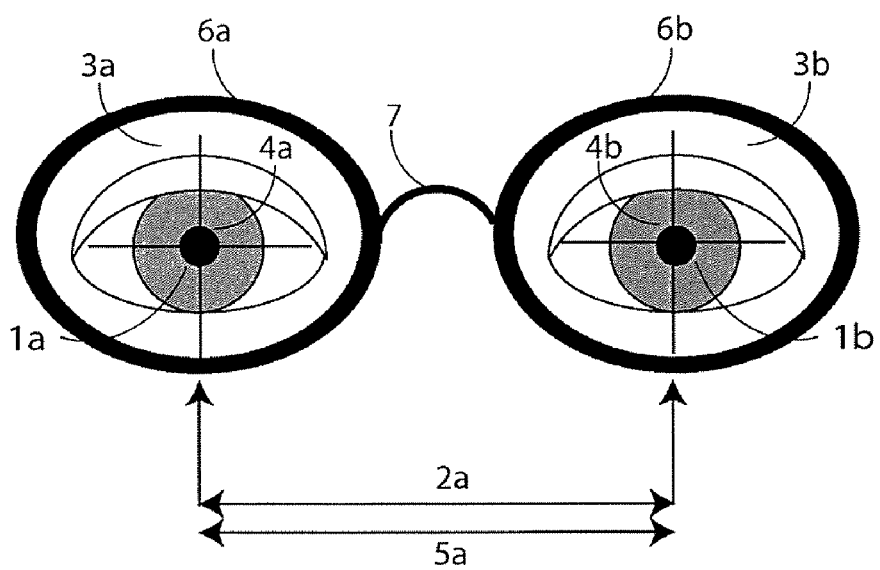
FIG. 3 presents a diagram showing a user wearing eyeglasses where the user's PD coincides with the OCD of the eyeglasses
Figure 4:
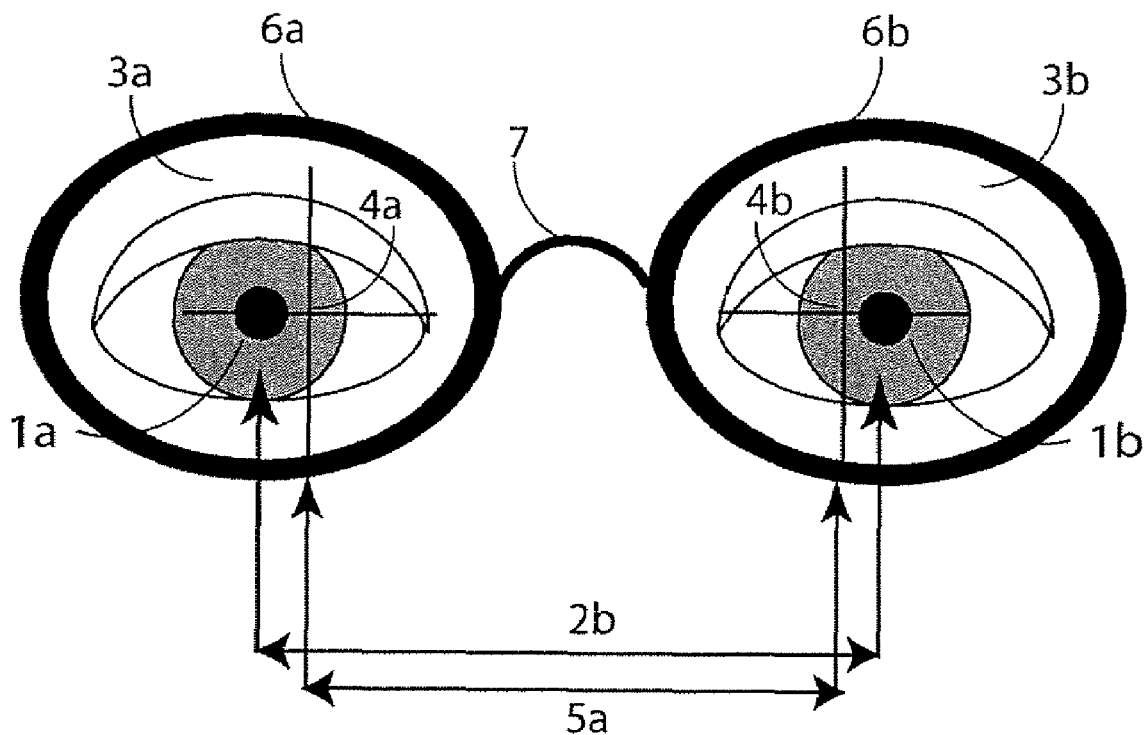
FIG. 4 presents a diagram showing a user wearing eyeglasses where the user's PD is greater than the OCD of the eyeglasses.
Figure 5:
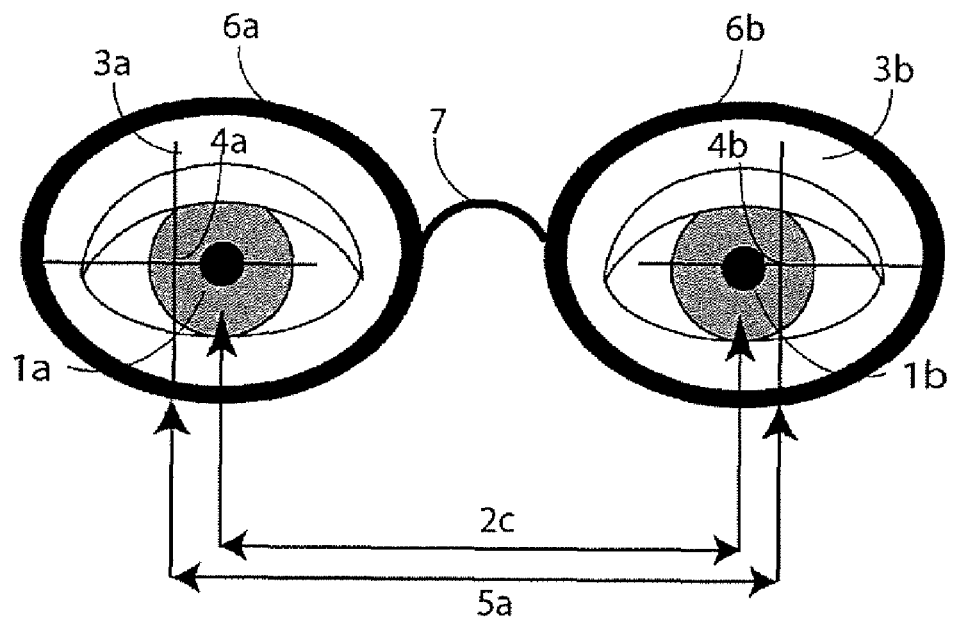
FIG. 5 presents a diagram showing a user wearing eyeglasses where the user's PD is smaller than the OCD of the eyeglasses.
Figure 6:
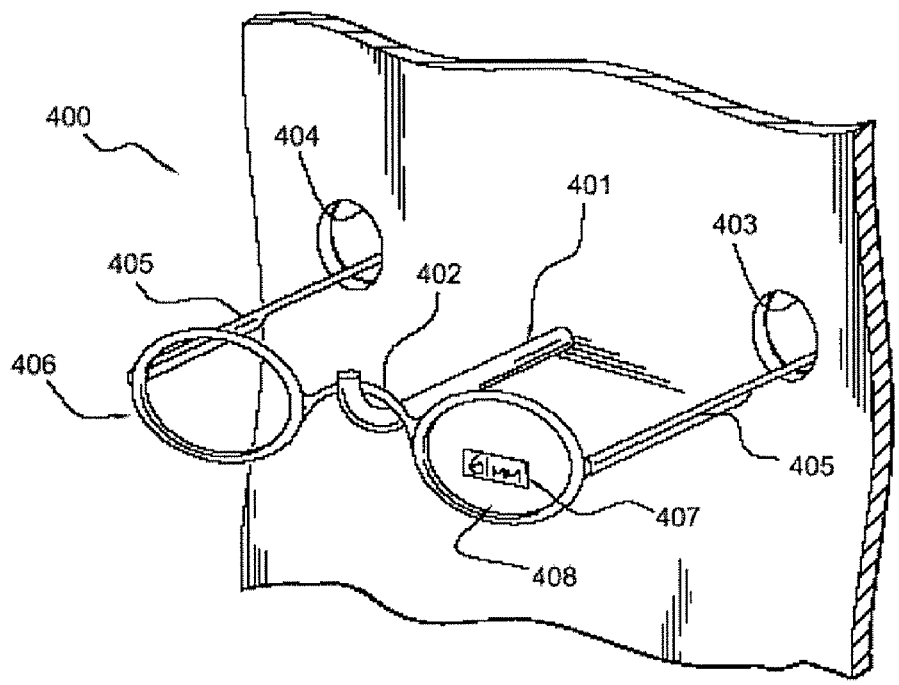
FIG. 6 presents one example of a holder for removably retaining eyeglasses on an eyeglass display.

A non-limiting example of the eyeglasses according to certain aspects of the present invention is shown in FIG. 3. The lenses 3a and 3b are held in place by any eyeglass frame, 6a and 6b, which hold the lenses in place. The lenses are spaced apart by the nosepiece or bridge 7 of the eyeglass frame. The lenses are held in front of a person's eyes and are separated by the nose piece. The frame will have various other components and features such as temples and, optionally, nose pads (not shown). The OCD of the eyeglasses shown in FIG. 3 coincide with the NPD of the user.

The lenses of the eyeglasses according to certain aspects of the present invention may be made of any lens material, including, but not limited to plastic, polycarbonate, acrylic, and glass, or any other less material suitable for ophthalmic or about +1.75; or about +2.00; or about +2.25; or about +2.50; or about +2.75; or about +3.00. The steps between Diopter settings may be in any gradient, e.g., 0.125 Diopter steps, or 0.25 Diopter steps, or 0.50 Diopter steps, or 0.75 Diopter steps, or 1.00 Diopter steps, etc.

As noted above, the eyeglasses according to certain aspects of the present invention may comprise eyeglasses with two, three, four, five, six, seven, eight or more OCDs to accommodate users with different PDs. In one embodiment, the eyeglasses according to certain aspects of the present invention comprise eyeglasses with two different OCDs. In a non-limiting example, the first OCD ($OCD_1$) is about 55 mm, or about 56 mm or about 57 mm. This OCD will accommodate users with a NPD of about 50 mm to about 63 mm when considering +1.00 Diopter power eyeglasses. The second OCD ($OCD_2$) is about 63 mm, or about 64 mm or about 65 mm. This OCD will accommodate users with a NPD of about 58 mm to about 71 mm when considering +1.00 Diopter power eyeglasses. In a preferred embodiment, the two different OCDs, $OCD_1$ and $OCD_2$, are about 56.4 mm and about 64.4 mm, respectively; or about 56.9 mm and about 63.9 mm, respectively. Table 4, below, summarizes the NPDs that are accommodated by the two aforementioned OCDs, as a function of Diopter power.

TABLE 4

| Diopter Power | $OCD_1$ | $OCD_2$ |
|---|---|---|
| 1.25 | about 52 mm to about 61 mm | about 60 mm to about 69 mm |
| 1.50 | about 52 mm to about 60 mm | about 60 mm to about 68 mm |
| 1.75 | about 53 mm to about 60 mm | about 61 mm to about 68 mm |
| 2.00 | about 54 mm to about 59 mm | about 62 mm to about 67 mm |
| 2.25 | about 54 mm to about 59 mm | about 62 mm to about 67 mm |
| 2.50 | about 54 mm to about 59 mm | about 62 mm to about 67 mm |
| 2.75 | about 54 mm to about 58 mm | about 62 mm to about 66 mm |
| 3.00 | about 55 mm to about 58 mm | about 63 mm to about 66 mm |

In another embodiment, the eyeglass display comprises eyeglasses with three different OCDs. In a non-limiting example, the first OCD ($OCD_3$) is about 54 mm, or about 55 mm or about 56 mm. This OCD will accommodate users with a NPD of about 54 mm to about 57 mm when considering +1.00 Diopter power eyeglasses. The second OCD ($OCD_4$) is about 59 mm, or about 60 mm or about 61 mm. This OCD will accommodate users with a NPD of about 59 mm to about 62 mm when considering +1.00 Diopter power eyeglasses. The third OCD ($OCD_5$) is about 64 mm or about 65 mm or about 66 mm. This OCD will accommodate users with a NPD of about 59 mm to about 72 mm when considering +1.00 Diopter power eyeglasses. In a preferred embodiment, the three different OCDs, $OCD_3$, $OCD_4$ and $OCD_5$, are about 55.4 mm, about 60.4 mm and about 65.4 mm, respectively; or about 54.9 mm, about 60.4 mm, and about 65.9 mm, respectively. Table 5, below, summarizes the NPDs that are accommodated by the three aforementioned OCDs, as a function of Diopter power.

TABLE 5

| Diopter Power | $OCD_3$ | $OCD_4$ | $OCD_5$ |
|---|---|---|---|
| 1.25 | about 51 mm to about 60 mm | about 56 mm to about 65 mm | about 61 mm to about 70 mm |
| 1.50 | about 51 mm to about 59 mm | about 56 mm to about 64 mm | about 61 mm to about 69 mm |
| 1.75 | about 52 mm to about 59 mm | about 57 mm to about 64 mm | about 62 mm to about 69 mm |
| 2.00 | about 53 mm to about 58 mm | about 58 mm to about 63 mm | about 63 mm to about 68 mm |
| 2.25 | about 53 mm to about 58 mm | about 58 mm to about 63 mm | about 63 mm to about 68 mm |
| 2.50 | about 53 mm to about 58 mm | about 58 mm to about 63 mm | about 63 mm to about 68 mm |
| 2.75 | about 53 mm to about 57 mm | about 58 mm to about 62 mm | about 63 mm to about 67 mm |
| 3.00 | about 54 mm to about 57 mm | about 59 mm to about 62 mm | about 64 mm to about 67 mm |

In another embodiment, the eyeglass display comprises eyeglasses with four different OCDs. In a non-limiting example, the first OCD ($OCD_6$) is about 52 mm, or about 53 mm or about 54 mm. This OCD will accommodate users with a NPD of about 48 mm to about 59 mm when considering +1.00 Diopter power eyeglasses. The second OCD ($OCD_7$) is about 57 mm, or about 58 mm or about 59 mm. This OCD will accommodate users with a NPD of about 52 mm to about 64 mm when considering +1.00 Diopter power eyeglasses. The third OCD ($OCD_8$) is about 62 mm or about 63 mm or about 64 mm. This OCD will accommodate users with a NPD of about 57 mm to about 69 mm when considering +1.00 Diopter power eyeglasses. The fourth OCD ($OCD_9$) is about 67 mm or about 68 mm or about 69 mm. This OCD will accommodate users with a NPD of about 62 mm to about 72 mm when considering +1.00 Diopter power eyeglasses. In a preferred embodiment, the four different OCDs, $OCD_6$, $OCD_7$, $OCD_8$ and $OCD_9$, are about 52.9 mm, about 57.9 mm, about 62.9 and about 67.9 mm, respectively. Table 6, below, summarizes the NPDs that are accommodated by the four aforementioned OCDs, as a function of Diopter power.

TABLE 6

| Diopter Power | $OCD_6$ | $OCD_7$ | $OCD_8$ | $OCD_9$ |
|---|---|---|---|---|
| 1.25 | about 48 mm to about 58 mm | about 53 mm to about 63 mm | about 58 mm to about 68 mm | about 63 mm to about 72 mm |
| 1.50 | about 49 mm to about 57 mm | about 54 mm to about 62 mm | about 59 mm to about 67 mm | about 64 mm to about 72 mm |
| 1.75 | about 50 mm to about 56 mm | about 55 mm to about 61 mm | about 60 mm to about 66 mm | about 65 mm to about 71 mm |
| 2.00 | about 50 mm to about 56 mm | about 55 mm to about 61 mm | about 60 mm to about 66 mm | about 65 mm to about 71 mm |
| 2.25 | about 50 mm to about 55 mm | about 56 mm to about 60 mm | about 60 mm to about 65 mm | about 65 mm to about 70 mm |
| 2.50 | about 51 mm to about 55 mm | about 56 mm to about 60 mm | about 61 mm to about 65 mm | about 66 mm to about 70 mm |
| 2.75 | about 51 mm to about 55 mm | about 56 mm to about 60 mm | about 61 mm to about 65 mm | about 66 mm to about 70 mm |
| 3.00 | about 51 mm to about 55 mm | about 56 mm to about 60 mm | about 61 mm to about 65 mm | about 66 mm to about 70 mm |

In another embodiment, the eyeglass display comprises eyeglasses with one to four different OCDs, depending upon the Diopter power. In a non-limiting example, the first OCD ($OCD_1$) is about 55 mm, or about 56 mm or about 57 mm, and, when paired with a second OCD ($OCD_2$) of about 63 mm, or about 64 mm or about 65 mm, these OCDs combined will keep unwanted prism below the 0.66 prism diopter threshold for more than 95% of all users with any NPD when considering +1.00 to +1.75 Diopter power eyeglasses. In a preferred embodiment, the two different OCDs, $OCD_1$ and $OCD_2$, are about 56.4 mm and about 64.4 mm, respectively for powers +1.00, +1.25, +1.50 and +1.75 Diopters. For powers +2.00, +2.25, +2.50 and +2.75, 95% of all people can wear OTC eyeglasses without prism greater than 0.66 prism diopters if three different OCDs, ($OCD_3$), about 54 mm, or about 55 mm or about 56 mm, combined with ($OCD_4$), which is about 59 mm, or about 60 mm or about 61 mm and further combined with ($OCD_5$) of about 64 mm or about 65 mm or about 66 mm. In a preferred embodiment, the three different OCDs, $OCD_3$, $OCD_4$ and $OCD_5$, are about 55.4 mm, about 60.4 mm and about 65.4 mm, respectively. For +3.00 Diopter power, four different OCDs are required to cover 95% of the population. In a non-limiting example, the first OCD ($OCD_6$) is about 52 mm, or about 53 mm or about 54 mm, the second OCD ($OCD_7$) is about 57 mm, or about 58 mm or about 59 mm, the third OCD ($OCD_8$) is about 62 mm or about 63 mm or about 64 mm, the fourth OCD ($OCD_9$) is about 67 mm or about 68 mm or about 69 mm. In a preferred embodiment, the four different OCDs, $OCD_6$, $OCD_7$, $OCD_8$ and $OCD_9$, are about 52.9 mm, about 57.9 mm, about 62.9 and about 67.9 mm, respectively. Table 7, below, summarizes the percentage of the population that are accommodated by the aforementioned combination of OCDs, as a function of Diopter power.

TABLE 7

| Diopter | # OCD Settings | OCD | % People |
|---|---|---|---|
| +1.00 | 2 | 56.4, 64.4 | 99% |
| +1.25 | 2 | 56.4, 64.4 | 98% |
| +1.50 | 2 | 56.4, 64.4 | 97% |
| +1.75 | 2 | 56.4, 64.4 | 96% |
| +2.00 | 3 | 55.4, 60.4, 65.4 | 96% |
| +2.25 | 3 | 55.4, 60.4, 65.4 | 96% |
| +2.50 | 3 | 55.4, 60.4, 65.4 | 96% |
| +2.75 | 3 | 55.4, 60.4, 65.4 | 95% |
| +3.00 | 4 | 52.9, 57.9, 62.9, 67.9 | 99% |

Thus, in one embodiment, the invention provides a plurality of pairs of eyeglasses, comprising at most two OCDs wherein the OCDs are configured to accommodate at least 95% of the adult human population at any Diopter power of the plurality of pairs of eyeglasses. In another embodiment, the invention provides a plurality of pairs of eyeglasses, comprising at most two OCDs wherein the OCDs are configured to accommodate at least 95% of the adult human population for Diopter powers of +1.75 Diopters or less. In one embodiment, one of the OCDs is about 55 mm, or about 56 mm or about 57 mm, and, the other OCD is about 63 mm, or about 64 mm or about 65 mm. In a preferred embodiment, the two OCDs are about 56.4 mm and about 64.4 mm.

In another embodiment, the invention provides a plurality of pairs of eyeglasses, comprising: at most three optical center distances (OCDs) wherein: the OCDs are configured to accommodate at least 95% of the adult human population at any Diopter power of the plurality of pairs of eyeglasses. In another embodiment, the invention provides a plurality of pairs of eyeglasses, comprising at most three OCDs wherein the OCDs are configured to accommodate at least 95% of a adult human population at Diopter powers up to and including +2.75 of the plurality of pairs of eyeglasses. In an embodiment, one of the OCDs is about 54 mm, or about 55 mm or about 56 mm, the other OCD is about 59 mm, or about 60 mm or about 61 mm and the last OCD is about 64 mm or about 65 mm or about 66 mm. In a preferred embodiment, the three OCDs are about 55.4 mm, about 60.4 mm and about 65.4 mm.

In still another embodiment, the invention provides a plurality of pairs of eyeglasses, comprising: at most four optical center distances (OCDs) wherein: the OCDs are configured to accommodate at least 95% of the adult human population at any Diopter power of the plurality of pairs of eyeglasses. In another embodiment, the invention provides a plurality of pairs of eyeglasses, comprising at most four OCDs wherein the OCDs are configured to accommodate at least 95% of a adult human population at any Diopter power of the plurality of pairs of eyeglasses. In an embodiment, one of the OCDs is about 52 mm, or about 53 mm or about 54 mm, another OCD is about 57 mm, or about 58 mm or about 59 mm, another OCD is about 62 mm or about 63 mm or about 64 mm, and the last OCD is about 67 mm or about 68 mm or about 69 mm. In a preferred embodiment, the four OCDs, are about 52.9 mm, about 57.9 mm, about 62.9 and about 67.9 mm.

In yet another embodiment, the invention provides a plurality of pairs of eyeglasses, comprising at least two OCD wherein the OCDs are configured to accommodate at least 95% of a national population at any Diopter power of the plurality of pairs of eyeglasses. In another embodiment, the invention provides a plurality of pairs of eyeglasses, comprising at least two OCD wherein the OCDs are configured to minimize the prism for more or less than 95% of the NPDs at any Diopter power of the plurality of pairs of eyeglasses. In still another embodiment, the invention provides a plurality of pairs of eyeglasses, comprising: at least two optical center distances (OCDs) wherein: the OCDs are selected to reduce the prism for a greater segment of the NPDs occurring in the adult human population at a given range of Diopter powers of the plurality of pairs of eyeglasses, than could occur with a single OCD setting.

IV. Conclusion

Thus, what has been described is eyeglasses, and a display therefor, where the eyeglasses have improved OCD settings. A first pair of eyeglasses has a different OCD than a second pair of eyeglasses and the lenses of the eyeglasses are uncovered by any layer that is releasably attached to the two static lenses of any of the plurality of pairs of eyeglasses. The eyeglasses may have two, three, four, five, six, seven, eight or more OCDs to accommodate users with different PDs, thus minimizing the aberrations and prism and thereby increasing the comfort and wearability of the eyeglasses.

In addition, to eyeglasses with more than one OCD, eyeglasses with a single OCD have been described wherein the OCD of such glasses is about 3 mm less than the user's FPD.

What has been described is eyeglasses, comprising at most four OCDs or at most three OCDs, or at most two OCDs wherein the OCDs are configured to keep unwanted prism levels below 0.66 prism diopters for at least 95% of the NPDs occurring in the adult human population at any Diopter power.

Lastly, what has been described is eyeglasses comprising at most two OCDs wherein the OCDs are configured to lessen the induced prismatic power compared to a single OCD offering.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents and non-patent documents discussed above are hereby incorporated by reference into the Detailed Description of the Invention.

What is claimed is:

1. A method for providing a plurality of pairs of reading glasses comprising:
providing at least a first pair of eyeglasses that has a first lens and a second lens wherein
the first lens and second lens have a first optical center and a second optical center, respectively, that are spaced at a first optical center distance (OCD); and
providing at least a second pair of eyeglasses that has a third lens and a fourth lens wherein
the third lens and fourth lens have a third optical center and a fourth optical center, respectively, that are spaced at a second optical center distance (OCD), thereby providing at least two optical center distances (OCDs)
wherein,
based upon a given Diopter power and the number of OCDs being provided, ranges for the OCDs are determined and are selected to reduce the prism for a greater segment of near pupillary distances (NPDs) occurring in an adult human population at the given Diopter power, said ranges varying by Diopter power; and
providing said reading glasses for sale on an over the counter (OTC) retail non-prescription basis.

2. The method of claim 1, wherein said first OCD is from about 54 mm to about 59 mm and said second OCD is from about 62 mm to about 67 mm.

3. The method of claim 1, wherein said first and second OCDs are about 58 mm and about 62 mm, respectively.

4. The method of claim 1, wherein said first OCD is from about 55 mm to about 58 mm, and said second OCD is from about 58 mm to about 63 mm.

5. The method of claim 1, wherein said first OCD is from about 55 mm to about 58 mm, and said second OCD is from about 59 mm to about 62 mm.

6. The method of claim 1, wherein multiple OCDs are calculated and the least number are produced that reduce the prism for a specific portion of the NPDs occurring in the adult human population.

7. The method of claim 1, wherein the OCDs are calculated and produced to minimize the number of lenses required and NPDs occurring in the adult human population, or a portion of the adult human population, that will encounter more than 0.66 prism Diopters.

8. The method of claim 1, wherein the least number of OCDs are calculated and produced to maximize the number of NPDs occurring in the adult human population, or a portion of the adult human population, that will encounter less than 0.66 prism Diopters.

9. The method of claim 1, wherein the OCDs are calculated and produced to minimize the number of OCDs required and the percent of the NPDs occurring in the adult human population, or percent of a portion of the adult human population, that on average will experience more than 0.66 prism Diopters.

10. The method of claim 1, wherein the least number of OCDs are calculated and produced to maximize the percent of the NPDs occurring in the adult human population, or percent of a portion of the NPDs occurring in the adult human population, that on average will experience less than 0.66 prism Diopters.

11. The method of claim 1, wherein more than one OCD setting is available for a given Diopter power.

12. The method of claim 1, wherein the Diopter powers are in 0.125 Diopter steps and there may be more than one OCD setting available for the Diopter power.

13. A method for providing a plurality of pairs of reading glasses comprising:
providing a plurality of pairs of eyeglasses, wherein each of the plurality of pairs of eyeglasses have a first lens and a second lens, wherein
a first lens and a second lens of one of said plurality of pairs of eyeglasses have a first optical center and a second optical center, respectively, that are spaced at a first optical center distance (OCD), and further wherein
the first OCD is within a range of OCDs, and further wherein
each of the plurality of pairs of eyeglasses is provided at a given Diopter power;
determining the range of OCDs of the plurality of pairs of eyeglasses to provide based on
the given Diopter power, the number of OCDs per Diopter power, said number of OCDs variable by Diopter power, and to provide a reduction of a prism value for a greater segment of near pupillary distances (NPDs) occurring in an adult human population at the given Diopter power; and
providing the reading glasses for sale on an over the counter (OTC) retail non-prescription basis.

14. The method of claim 13, wherein said providing step includes the step of providing at least a second pair of eyeglasses that has a third lens and a fourth lens, wherein the third lens and fourth lens have a third optical center and a fourth optical center, respectively, that are spaced at a second optical center distance (OCD).

15. The method of claim 14, wherein said first OCD is from about 54 mm to about 59 mm and said second OCD is from about 62 mm to about 67 mm.

16. The method of claim 14, wherein said first and second OCDs are about 58 mm and about 62 mm, respectively.

17. The method of claim 14, wherein said first OCD is from about 55 mm to about 58 mm, and said second OCD is from about 58 mm to about 63 mm.

18. The method of claim 14, wherein said first OCD is from about 55 mm to about 58 mm, and said second OCD is from about 59 mm to about 62 mm.

19. The method of claim 14, wherein multiple OCDs are calculated and the least number are produced that reduce the prism for a specific portion of the NPDs occurring in the adult human population.

20. The method of claim 14, wherein the OCDs are calculated and produced to minimize the number of lenses required and NPDs occurring in the adult human population, or a portion of the adult human population, that will encounter more than 0.66 prism Diopters.

21. The method of claim 14, wherein the least number of OCDs are calculated and produced to maximize the number of NPDs occurring in the adult human population, or a portion of the adult human population, that will encounter less than 0.66 prism Diopters.

22. The method of claim 14, wherein the OCDs are calculated and produced to minimize the number of OCDs required and the percent of the NPDs occurring in the adult human population, or percent of a portion of the adult human population, that on average will experience more than 0.66 prism Diopters.

23. The method of claim 14, wherein the least number of OCDs are calculated and produced to maximize the percent of the NPDs occurring in the adult human population, or percent of a portion of the NPDs occurring in the adult human population, that on average will experience less than 0.66 prism Diopters.

24. The method of claim 13, wherein more than one OCD setting is available for a given Diopter power.

25. The method of claim 13, wherein the Diopter powers are in 0.125 Diopter steps and there may be more than one OCD setting available for the Diopter power.

* * * * *